(12) United States Patent  
Kirshenbaum

(10) Patent No.: US 7,424,461 B2
(45) Date of Patent: Sep. 9, 2008

(54) MULTI-MODULE GENETIC PROGRAMMING WITH MULTIPLE GENETIC DATA REPRESENTATIONS

(75) Inventor: Evan Randy Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1181 days.

(21) Appl. No.: 09/896,036

(22) Filed: Jun. 28, 2001

(65) Prior Publication Data

US 2003/0004904 A1    Jan. 2, 2003

(51) Int. Cl.
*G06F 15/18*    (2006.01)
*G06N 3/00*    (2006.01)
*G06N 3/12*    (2006.01)

(52) U.S. Cl. .................................................... 706/13
(58) Field of Classification Search .............. 706/13–44
See application file for complete search history.

(56) References Cited

U.S. PATENT DOCUMENTS

| | | | | |
|---|---|---|---|---|
| 5,136,686 A | * | 8/1992 | Koza | 706/13 |
| 5,148,513 A | * | 9/1992 | Koza et al. | 706/13 |
| 5,249,259 A | * | 9/1993 | Harvey | 706/13 |
| 5,390,282 A | * | 2/1995 | Koza et al. | 706/13 |
| 5,867,397 A | * | 2/1999 | Koza et al. | 703/14 |
| 6,922,712 B2 | * | 7/2005 | Pelton et al. | 708/403 |
| 6,988,089 B2 | * | 1/2006 | Kirshenbaum et al. | 706/14 |
| 7,072,814 B1 | * | 7/2006 | Stoica | 703/13 |

OTHER PUBLICATIONS

Melanie Mitchell "An Introduction to Genetic Algorithms" © 1996 Massachusetts Institute of Technology (MIT),chapter II, pp.*
Multiple genetic algorithm processor for the economic power dispatch problemSalami, M.; Cain, G.; Genetic Algorithms in Engineering Systems: Innovations and Applications, 1995. Galesia. First International Conference on Sep. 12-14, 1995 pp. 188-193.*
Application of multiple genetic algorithm processor in complex systems Salami, M.; Cain, G.; Artificial Neural Networks and Expert Systems, 1995. Proceedings., Second New Zealand International Two-Stream Conference on , Nov. 20-23, 1995 pp. 178-181.*
Using multiple genetic algorithms to generate radar point-scatterer models Hughes, E.J.; Leyland, M.; Evolutionary Computation, IEEE Transactions on , vol. 4, Issue: 2 , Jul. 2000 pp. 147-163.*
Hybridized crossover-based search techniques for program discovery O'Reilly, U.-M.; Oppacher, F.; Evolutionary Computation, 1995., IEEE International Conference on vol. 2, Nov. 29-Dec. 1, 1995 pp. 573-578 vol. 2 Digital Object Identifier 10.1109/ICEC.1995. 487447.*
Immune genetic programming based on register-stack structure Zeming Zhang; Wenjian Luo; Xufa Wang; Evolutionary Computation, 2007. CEC 2007. IEEE Congress on Sep. 25-28, 2007 pp. 3751-3758 ☐☐Digital Object Identifier 10.1109/CEC.2007. 4424959 ☐☐.*

(Continued)

*Primary Examiner*—Michael B Holmes

(57) ABSTRACT

A method for genetic programming which is based on multiple genetic data component representations. Multiple genetic data component representations are determined and a solution is evolved using a set of genetic data components represented by the multiple genetic data component representations.

15 Claims, 6 Drawing Sheets

OTHER PUBLICATIONS

Evolution of Processor microcode Jackson, D.; Evolutionary Computation, IEEE Transactions on vol. 9, Issue 1, Feb. 2005 pp. 44-54 Digital Object Identifier 10.1109/TEVC.2004.837922.*

Human readable genetic rules for scene boundary detection Parmar, M.J.; Angelides, M.C.; Advanced Information Networking and Applications, 2005. AINA 2005. 19th International Conference on vol. 2, Mar. 28-30, 2005 pp. 541-546 vol. 2 Digital Object Identifier 10.1109/AINA.2005.201.*

Efficient machine-code test-program induction Corno, F.; Cumani, G.; Sonza Reorda, M.; Squillero, G.; Evolutionary Computation, 2002. CEC '02. Proceedings of the 2002 Congress on vol. 2, May 12-17, 2002 pp. 1486-1491 Digital Object Identifier 10.1109/CEC.2002.1004462.*

* cited by examiner

MULTI-MODULE GENETIC PROGRAMMING WITH MULTIPLE GENETIC DATA REPRESENTATIONS

BACKGROUND OF THE INVENTION

1. Field of Invention

The present invention pertains to the field of genetic programming. More particularly, this invention relates to genetic data representations in genetic programming.

2. Art Background

Genetic programming may be used to obtain a variety of problem solutions. A problem solution obtainable through genetic programming may take the form of a computer program, a math function, an electrical circuit, finite automata, a graph structure, or a neural network to name a few examples.

Genetic programming may be defined as a computer-based programming methodology in which problem solutions are generated using an iterative process that simulates evolution by natural selection. Genetic programming typically involves the generation of an initial population of candidate solutions. A candidate solution plays a role analogous to an organism in biological evolution. Each candidate solution in a population is typically evaluated as a solution to a particular development problem using a fitness measure. If a candidate solution is considered good enough in terms of the fitness measure, then it is usually selected as the solution. Otherwise, a subset of the candidate solutions from the population are typically selected to become parents for a population of child candidate solutions. The child candidate solutions are then generated and evaluated as solutions using the fitness measure. The process repeats through generations of child populations until an individual candidate solution that is good enough is found or until it is decided that the process has gone on sufficiently long that it is not worth proceeding.

Child candidate solutions are typically created by combining genetic data components from parent candidate solutions using techniques that are modeled on biological processes such as mutation and crossover. Typically, the genetic data component of a candidate solution in prior genetic programming methods is represented as a parse tree or a sequence of instructions. It is desirable to use a genetic data component representation that decreases the number of generations of candidate solutions that need to be evaluated before obtaining a suitable solution. This would decrease the overall costs associated with using genetic programming to obtain problem solutions.

SUMMARY OF THE INVENTION

A method for genetic programming is disclosed which is based on multiple genetic data component representations. Multiple genetic data component representations are determined and a solution is evolved using a set of genetic data components represented by the multiple genetic data component representations.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
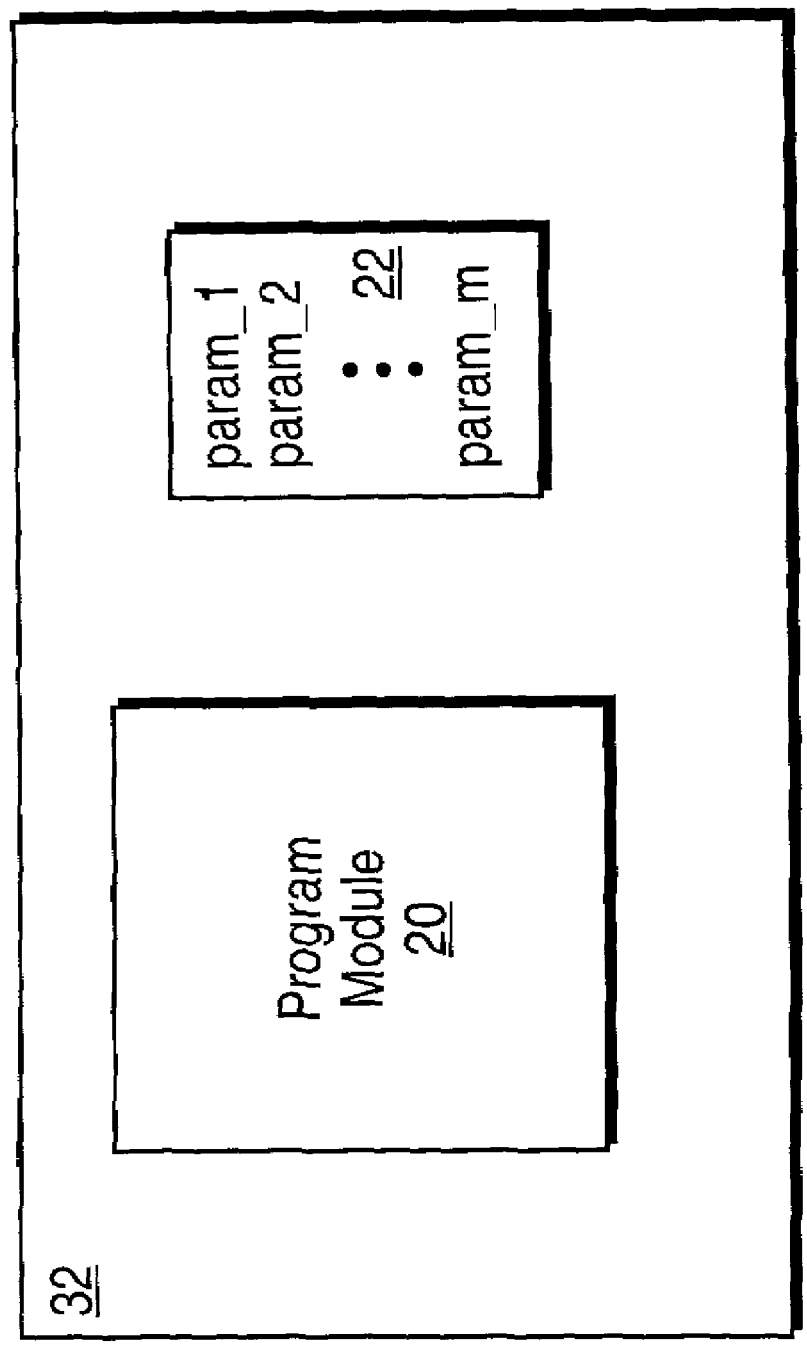
FIG. 1 illustrates an example of a candidate solution which is partitioned into a program module and a parameters module.

According to the present method for genetic programming, multiple genetic data component representations are determined and a solution is evolved using a set of genetic data components represented by the genetic data component representations. The genetic data component representations may be determined by determining a model for the solution such that the model includes a set of modules. A solution may be evolved by parameterizing each module based on the genetic data components.

A genetic data component representation may be any data structure (an array, a graph, a list, etc.) for which genetic operators may be defined.

One example of a genetic data component representation is a tree having nodes labeled with operators taken from an operator set.

Another example of a genetic data component representation is a sequence of instructions taken from an instruction set.

Another example of a genetic data component representation is a sequence of integers or floating-point numbers.

Yet another example of a genetic data component representation is a sequence of bits.

Evolving a solution may be performed in a known manner by generating generations of candidate solutions using genetic operators such as mutation and/or crossover. For example, parent candidate solutions of a generation may be selected based on their fitness and genetic data components for child candidate solutions obtained by performing crossover operations on the genetic data components of their parents. The genetic data components of parent and child candidate solutions have the representations determined according to the present teachings. The child candidate solutions may then be tested for fitness. The process may be repeated through subsequent generations until a suitable candidate solution is found.

The modules of a candidate solution are functional components which act in combination and in reaction to an environment to determine the fitness of the candidate solution. Each module is characterized by a "model" and realized (i.e. parameterized) by referring to one or more of the genetic data components.

One example of a model is a mathematical model having a set of parameters.

Another example of a model is a set of operational semantics of a programming language.

Another example of a model is a specification of an abstract machine.

Yet another example of a model is the semantics of a neural network or finite automaton.

Another example of a model is the physics of an electrical circuit or molecule.

The realization of a module may include reading a set of parameters out of a numeric sequence or a sequence of bits interpreted as numbers, interpreting a labeled tree as a parse tree for a program written in the language, interpreting a sequence of instructions as a program, or interpreting a tree or sequence as a recipe for the construction of a structure such as a neural network or electrical circuit.

The genetic data component representations include at least two different representations.

FIG. 1 illustrates an example of a model for a candidate solution 32. The candidate solution 32 includes a program module 20 and a parameters module 22. Any one or more of a set of operators of the program module 20 may reference any one or more of the param_1 through param_m of the parameters module 22. An example of operators in the program module 20 is as follows in pseudo-code.

gain(param_8, 0, param_2)+sin(param_4)

Figure 2:
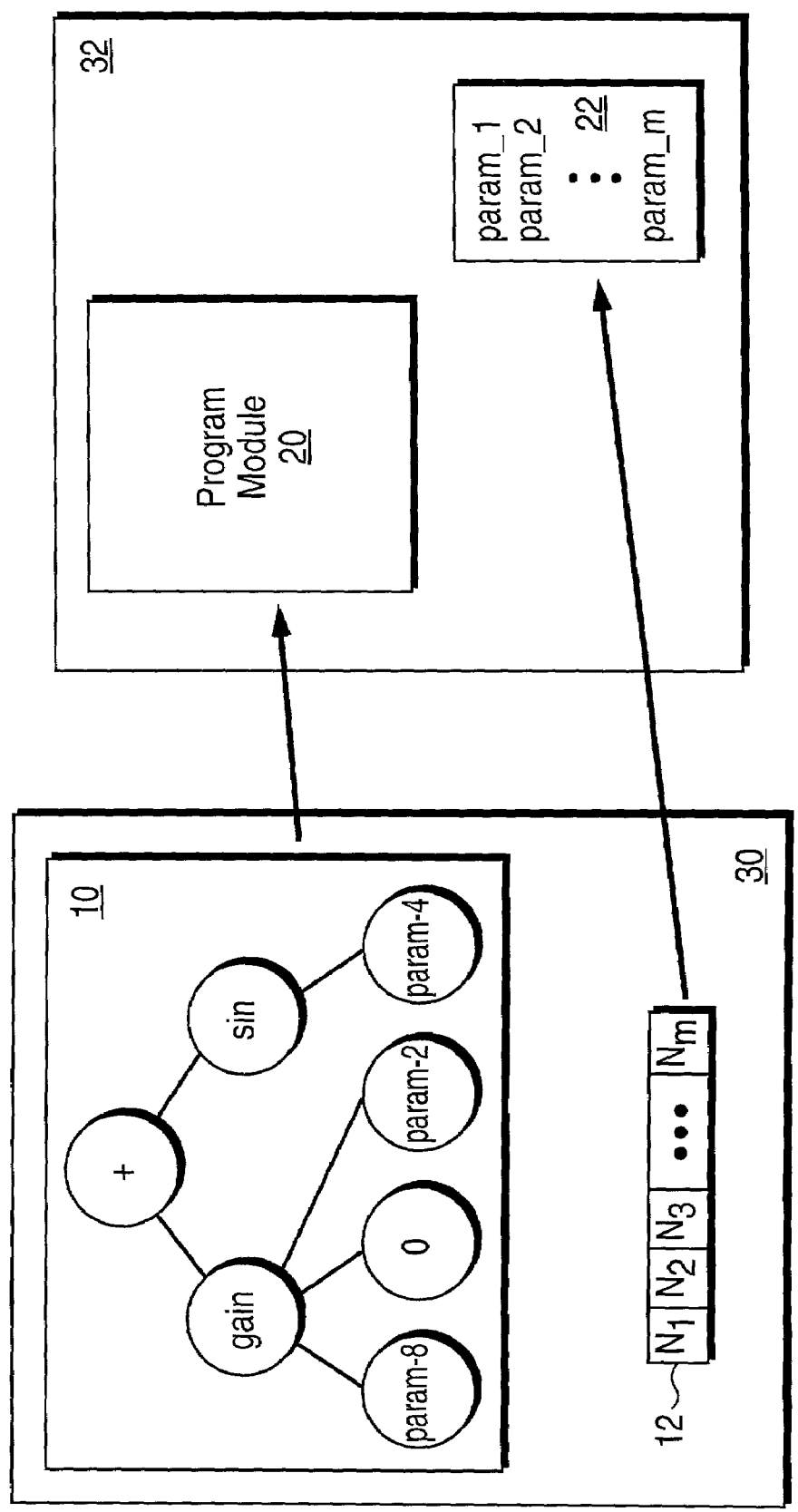
FIG. 2 shows multiple genetic data component representations for a candidate solution which includes a program module and a parameters module.

FIG. 2 shows multiple genetic data component representations 30 for the candidate solution 32. The genetic data component representations 30 include a genetic data component representation for each module of the candidate solution 32—a parse tree 10 corresponding to the program module 20 and a sequence of numbers 12 corresponding to the parameters module 22. The parse tree 10 and the sequence of numbers 22 are different representations. The parse tree 10 (genotype) is expressed as the program 20 (phenotype) and the sequence of numbers 12 (genotype) is expressed as the parameters 22 (phenotype).

Figure 3:
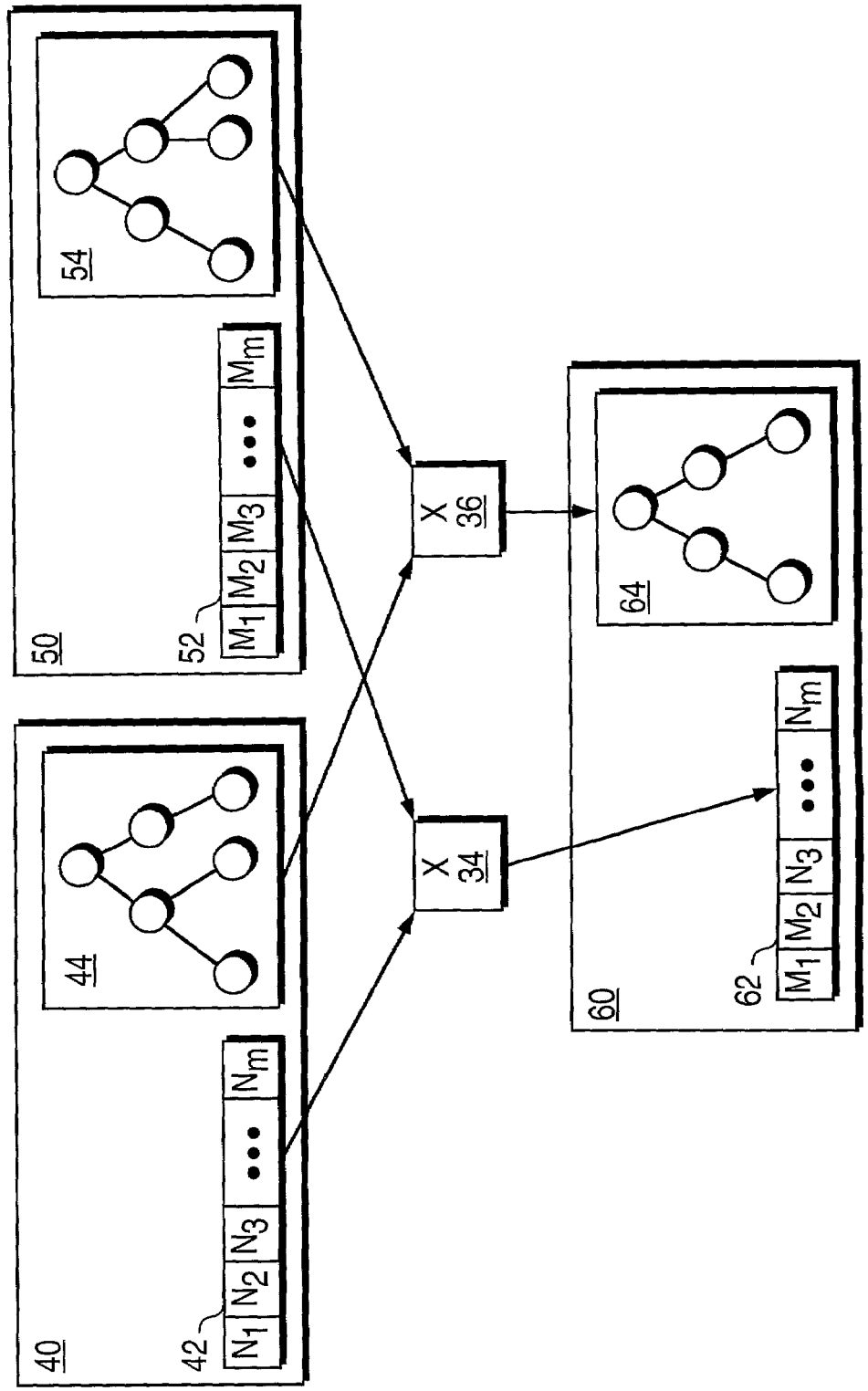
FIG. 3 illustrates a crossover operation on a pair of candidate solutions whose genotypes have genetic data component representations according to the present teachings.

FIG. 3 illustrates a crossover operation on a pair of candidate solutions 40 and 50 each of which has the genetic data component representations 30. The genotype of the candidate solution 40 includes a sequence of numbers 42 and a parse tree 44. The genotype of the candidate solution 50 includes a sequence of numbers 52 and a parse tree 54. A child candidate solution 60 of the candidate solutions 40 and 50 is formed by a pair of crossover operations 34 and 36 which operate on similar genetic data component representations. The crossover operation 34 performs crossover on the sequences of numbers 42 and 52 to yield a sequence of numbers 62. The crossover operation 36 performs crossover on the parse trees 44 and 54 to yield a parse tree 64. Not all of the components need to be involved in a mutation or crossover operation.

Figure 4:
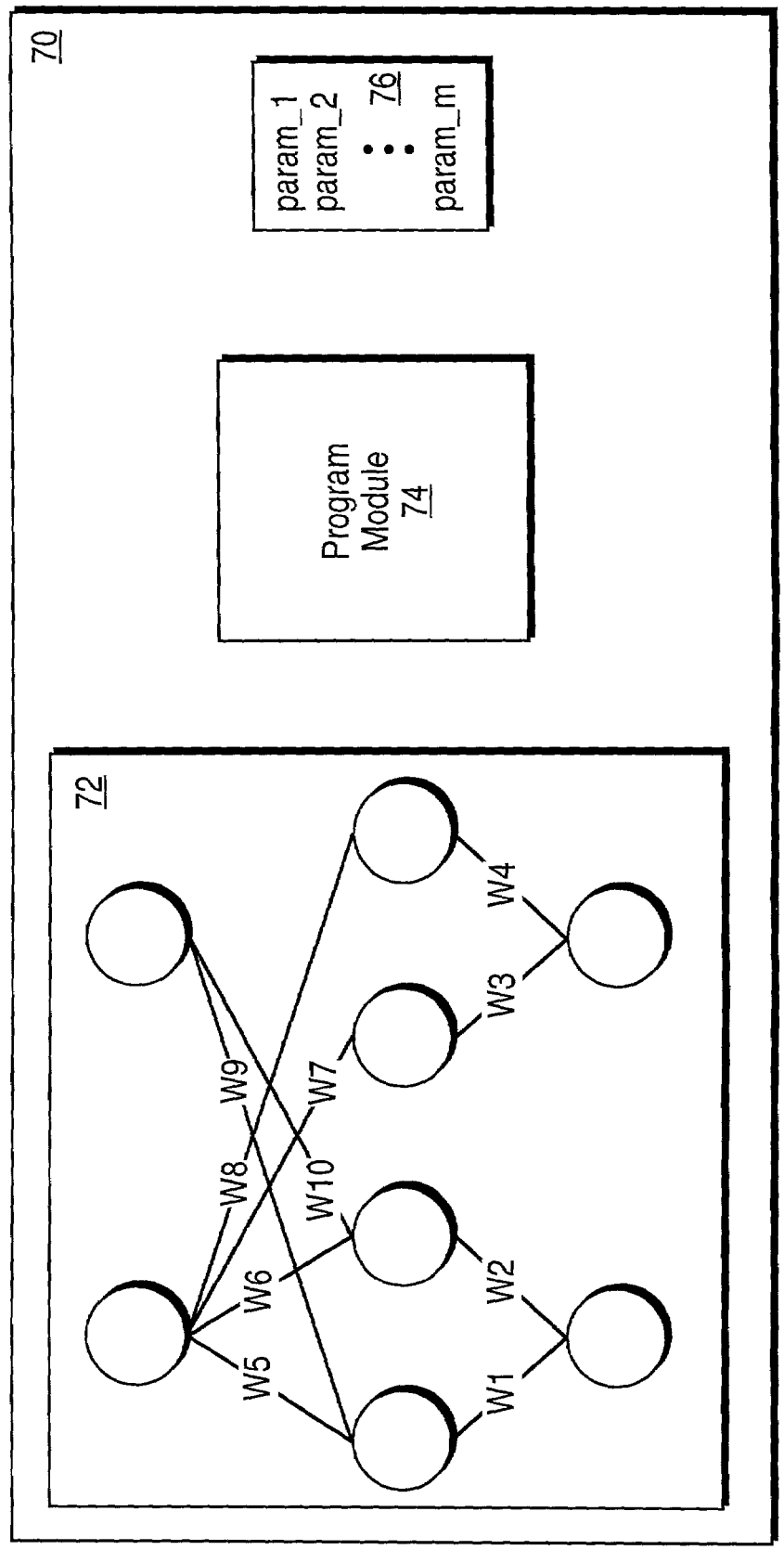
FIG. 4 illustrates an example of a candidate solution which includes a neural network module and a program module and a parameters module.

FIG. 4 illustrates another example of a model for a candidate solution 70. The candidate solution 70 includes a neural network module 72 and a program module 74 and a parameters module 76. Any one or more of the operators of the program module 74 may query the neural network module 72 and/or reference any one or more of the param_1 through param_m of the parameters module 76. An example of an operator that queries the neural network module 72 is as follows in pseudo-code.

net(param_4, 0, 1)*(−param_3)

Figure 5:
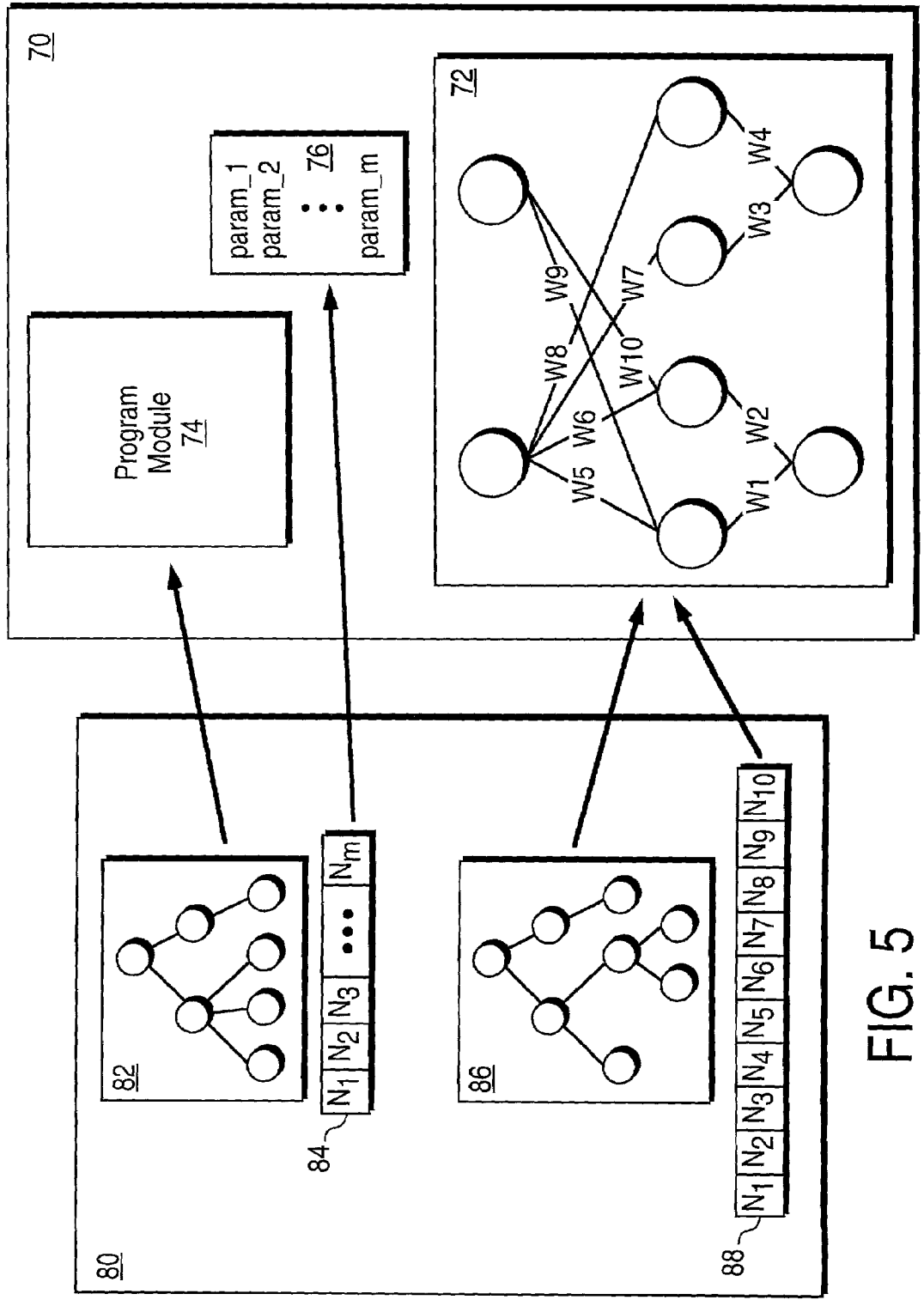
FIG. 5 illustrates multiple genetic data component representations for a candidate solution which includes a neural network module and a program module and a parameters module.

FIG. 5 shows multiple genetic data component representations 80 for the candidate solution 70. The genetic data component representations 80 include a genetic data component representation for each module of the candidate solution 70—a parse tree 82 corresponding to the program module 74, a sequence of numbers 84 corresponding to the parameters module 76, and a parse tree 86 together with a sequence of numbers 88 that correspond to the neural network module 72. The parse tree 82, the sequence of numbers 84, and the combination of the parse tree 86 and the sequence of numbers 88 are different representations in accordance with one embodiment. The parse tree 86 (genotype) may be used to determine the structure of the neural network module 72 (phenotype) and the sequence of numbers 88 (genotype) may be expressed as the weights W1-W10 (phenotype) of the neural network module 72.

Figure 6:
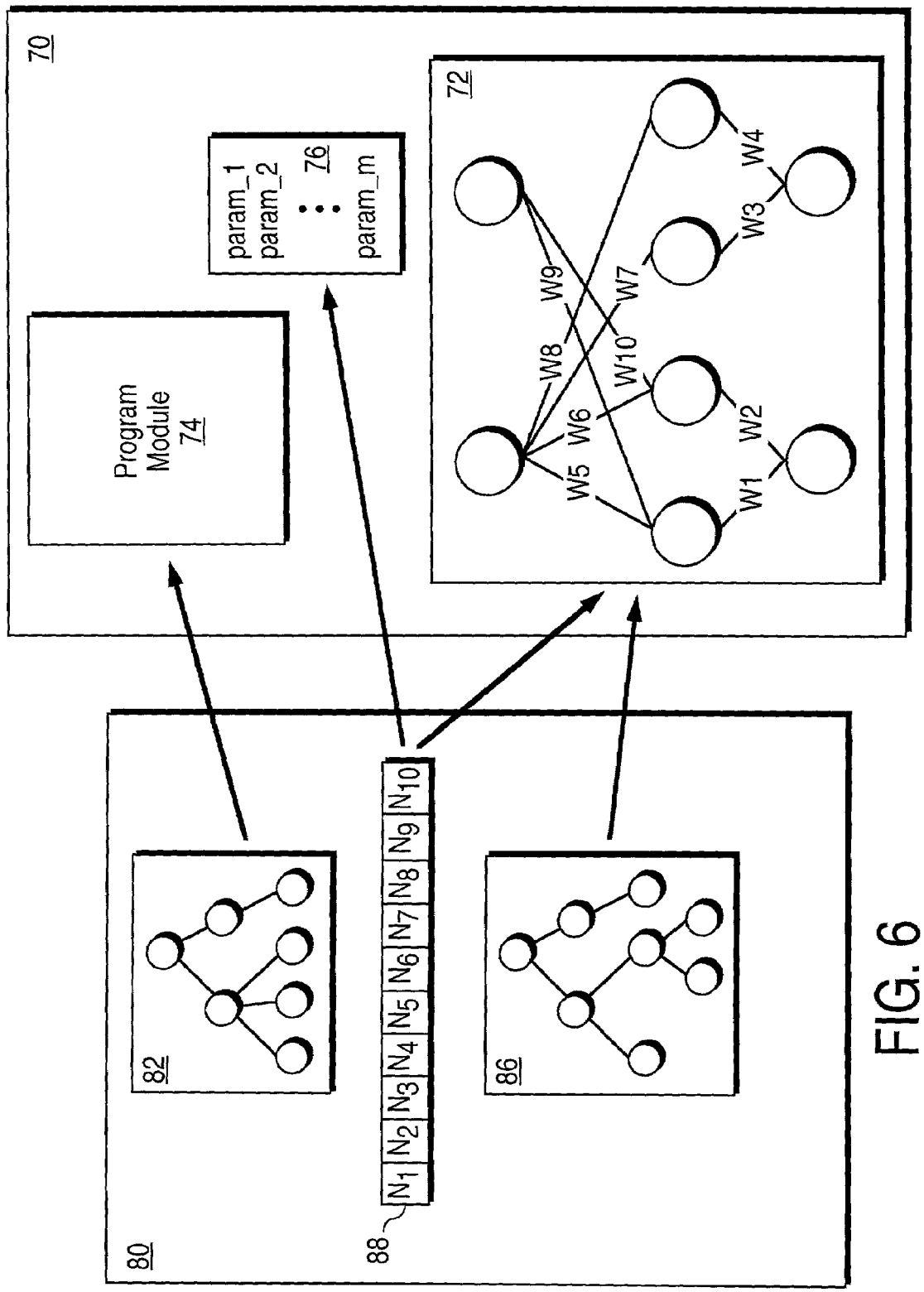
FIG. 6 illustrates another example of multiple genetic data component representations for a candidate solution which includes a neural network module and a program module and a parameters module.

FIG. 6 shows another example of multiple genetic data component representations 80 for the candidate solution 70. The genetic data component representations 80 include a genetic data component representation for each module of the candidate solution 70—the parse tree 82 corresponding to the program module 74, the sequence of numbers 88 corresponding to the parameters module 76 and the neural network module 72, and a parse tree 86 together with the sequence of numbers 88 that correspond to the neural network module 72. In this alternative mapping of genetic data component representations to modules, the set of parameters 76 are taken from the sequence of numbers 88 which also provides parameters for the neural network module 72.

A model for a candidate solution may have only one module which is parameterized by multiple genetic data components.

In one embodiment, crossover operations and/or mutation operations are performed by matching the genetic data component representations. For example, parse trees or sequences of instructions that represent computer programs are crossed over with other parse trees or sequences of instructions that represent computer programs and not with, for example, parse trees that represent functions or structures and not with sequences of numbers. Parse trees that represent neural network structures are crossed over with other parse trees that represent neural network structures. Sequences of numbers that represent program parameters are crossed over with other sequences of numbers that represent program parameters. Sequences of numbers that represent neural network weights are crossed over with other sequences of numbers that represent neural network weights.

Alternatively, multiple genetic data component representations may be designated for crossover. For example, in some embodiments, any sequence of numbers may be crossed over with any other sequence of numbers regardless of their phenotypes.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for genetic programming, comprising the steps of:

determining a first genetic data component representation for expressing a solution model;

determining a second genetic data component representation for expressing the solution model;

generating a candidate solution by combining a genetic data component having the first genetic data component representation from a first parent solution with a genetic data component having the first genetic data component representation from a second parent solution and combining a genetic data component having the second genetic data component representation from the first parent solution with a genetic data component having the second genetic data component representation from the second parent solution; and realizing the solution model as a recipe for constructing a structure that includes a neural network or an electrical circuit.

2. The method of claim 1, wherein the first and second genetic data component representations pertain to a first and a second module, respectively, of the solution model.

3. The method of claim 2, wherein the first and second modules include a program module.

4. The method of claim 3, wherein the genetic data component representation for the program module is a parse tree.

5. The method of claim 3, wherein the genetic data component representation for the program module is a sequence of instructions.

6. The method of claim 2, wherein the first and second modules include a parameters module.

7. The method of claim 6, wherein the genetic data component representation for the parameters module is a sequence of numbers.

8. The method of claim 7, wherein the sequence of numbers provides a set of parameters for a program module.

9. The method of claim 7, wherein the sequence of numbers provides a set of parameters for a math function module.

10. The method of claim 7, wherein the sequence of numbers provides a set of weights for a neural network module.

11. The method of claim 2, wherein the first and second modules include a neural network module.

12. The method of claim 11, wherein a the genetic data component representation of the neural network module is a parse tree.

13. The method of claim 2, wherein the first and second modules include a math function module.

14. The method of claim 13, wherein a the genetic data component representation of the math function module is a parse tree.

15. The method of claim 1, wherein the steps of combining include the step of matching the first and second genetic data component representations.

* * * * *

UNITED STATES PATENT AND TRADEMARK OFFICE
CERTIFICATE OF CORRECTION

| | | |
|---|---|---|
| PATENT NO. | : 7,424,461 B2 | Page 1 of 1 |
| APPLICATION NO. | : 09/896036 | |
| DATED | : September 9, 2008 | |
| INVENTOR(S) | : Evan Randy Kirshenbaum | |

It is certified that error appears in the above-identified patent and that said Letters Patent is hereby corrected as shown below:

In column 6, line 7, in Claim 12, after "wherein" delete "a".

In column 6, line 13, in Claim 14, after "wherein" delete "a".

Signed and Sealed this

Twenty-eighth Day of April, 2009

JOHN DOLL
*Acting Director of the United States Patent and Trademark Office*